(12) United States Patent
Pan

(10) Patent No.: US 11,080,306 B2
(45) Date of Patent: Aug. 3, 2021

(54) METHOD AND APPARATUS AND ELECTRONIC DEVICE FOR CLUSTERING

(71) Applicant: Beijing SenseTime Technology Development Co., Ltd, Beijing (CN)

(72) Inventor: Xinyu Pan, Beijing (CN)

(73) Assignee: Beijing SenseTime Technology Development Co., Ltd., Beijing (CN)

( * ) Notice: Subject to any disclaimer, the term of this patent is extended or adjusted under 35 U.S.C. 154(b) by 866 days.

(21) Appl. No.: 15/859,345

(22) Filed: Dec. 30, 2017

(65) Prior Publication Data

US 2018/0129727 A1 May 10, 2018

Related U.S. Application Data

(63) Continuation of application No. PCT/CN2017/091432, filed on Jul. 3, 2017.

(30) Foreign Application Priority Data

Jul. 22, 2016 (CN) .......................... 201610586139.8

(51) Int. Cl.
| | | |
|---|---|---|
| *G06F 16/28* | (2019.01) | |
| *G06F 16/35* | (2019.01) | |
| *G06F 7/14* | (2006.01) | |
| *G06F 7/08* | (2006.01) | |
| *G06K 9/62* | (2006.01) | |

(52) U.S. Cl.
CPC .............. *G06F 16/285* (2019.01); *G06F 7/08* (2013.01); *G06F 7/14* (2013.01); *G06F 16/35* (2019.01); *G06K 9/6222* (2013.01)

(58) Field of Classification Search
CPC .......... G06F 16/285; G06F 16/35; G06F 7/08; G06F 7/14
See application file for complete search history.

(56) References Cited

U.S. PATENT DOCUMENTS

| | | | | |
|---|---|---|---|---|
| 6,941,321 | B2 * | 9/2005 | Schuetze | ............... G06F 16/355 707/999.01 |
| 2011/0123120 | A1 * | 5/2011 | Quack | ..................... G06F 16/51 382/197 |
| 2015/0286707 | A1 * | 10/2015 | Levitan | ............... G06F 16/9027 707/737 |

FOREIGN PATENT DOCUMENTS

| | | |
|---|---|---|
| CN | 102915347 A | 2/2013 |
| CN | 103679190 A | 3/2014 |
| CN | 103699653 A | 4/2014 |

(Continued)

OTHER PUBLICATIONS

Notification of the Third Office Action of Chinese application No. 201610586139.8, dated Nov. 1, 2018.

(Continued)

*Primary Examiner* — Kannan Shanmugasundaram

(74) *Attorney, Agent, or Firm* — Syncoda LLC; Feng Ma

(57) ABSTRACT

The present disclosure provides a clustering method and apparatus and an electronic device. The method includes: acquiring an inter-sample similarity between every two pieces of sample data in M pieces of sample data, where M is a positive integer; merging the M pieces of sample data into N initialization clustered clusters according to the acquired inter-sample similarity, where N is a positive integer smaller than M; and clustering and merging the N initialization clustered clusters to obtain multiple clustered clusters corresponding to the M pieces of sample data.

16 Claims, 11 Drawing Sheets

---

Obtaining at least one first inter-sample similarity between each piece of sample data in a first to-be-clustered cluster and each piece of sample data in a second to-be-clustered cluster — S401

Determining the range of similarity — S402

Calculating the inter-cluster similarity between the first to-be-clustered cluster and the second to-be-clustered cluster according to the first inter-sample similarities in the range of similarity — S403

(56) References Cited

FOREIGN PATENT DOCUMENTS

| | | |
|---|---|---|
| CN | 104123279 A | 10/2014 |
| CN | 104252627 A | 12/2014 |
| CN | 104268149 A | 1/2015 |
| CN | 104281569 A | 1/2015 |
| CN | 104731789 A | 6/2015 |
| CN | 106228188 A | 12/2016 |
| WO | 2014067296 A1 | 5/2014 |

OTHER PUBLICATIONS

English Translation of the Written Opinion of the International Search Authority in international application No. PCT/CN2017/091432, dated Oct. 11, 2017.
English Translation of International Search Report in international application No. PCT/CN2017/091432, dated Oct. 11, 2017.
The Written Opinion of the International Search Authority in international application No. PCT/CN2017/091432, dated Oct. 11, 2017.
Balcan M F, Gupta P. Robust hierarchical clustering[C]//in Proceedings of the Conference on Learning Theory (COLT. 2010.

* cited by examiner

METHOD AND APPARATUS AND ELECTRONIC DEVICE FOR CLUSTERING

CROSS-REFERENCE TO RELATED APPLICATIONS

This is a continuation application of PCT/CN2017/091432, filed on Jul. 3, 2017, which claims priority to Chinese Patent Application No. 201610586139.8, filed on Jul. 22, 2016, entitled "CLUSTERING METHOD AND APPARATUS AND ELECTRONIC DEVICE." The disclosures of these applications are incorporated by reference herein in their entirety.

BACKGROUND

There are often a lot of complex data in life. It often needs to cluster the data for the factors such as facilitating management or finding the data. Data having the same or similar features are clustered into one category, for example, clustering images including flowers into one category. In this way, users can find or manage required data according to the categories. How to rapidly and accurately cluster data having the same or similar features into one category is very worthy of concern.

SUMMARY

The present disclosure relates to the technical field of data processing, and in particular, to a method, an apparatus and an electronic device for clustering, and discloses a technical solution for clustering.

The present disclosure discloses a clustering method, comprising: acquiring an inter-sample similarity between every two pieces of sample data in M pieces of sample data, where M is a positive integer; merging the M pieces of sample data into N initialization clustered clusters according to the acquired inter-sample similarity, where N is a positive integer smaller than M; and clustering and merging the N initialization clustered clusters to obtain multiple clustered clusters corresponding to the M pieces of sample data.

In an optional implementation mode of the present disclosure, the merging the M pieces of sample data into N initialization clustered clusters according to the acquired inter-sample similarity comprises: for any two pieces of sample data in the M pieces of sample data, merging the two pieces of sample data into a suspected initialization clustered cluster when the inter-sample similarity of the two pieces of sample data is greater than a first threshold; and for the obtained multiple suspected initialization clustered clusters, merging at least two of the suspected initialization clustered clusters, both comprising a same subset having a number of pieces of sample data, which is greater than or equal to a second threshold, into an initialization clustered cluster.

In an optional implementation mode of the present disclosure, the merging the M pieces of sample data into N initialization clustered clusters according to the acquired inter-sample similarity comprises: for any two pieces of sample data in the M pieces of sample data, merging the two pieces of sample data into a suspected initialization clustered cluster when the inter-sample similarity of the two pieces of sample data is greater than a first threshold; and for a first suspected initialization clustered cluster and a second suspected initialization clustered cluster, both comprising a same subset having a number of pieces of sample data, which is greater than or equal to a second threshold, calculating a modulus of an intersection of the first and second suspected initialization clustered clusters, and dividing a sum of a modulus of a first initialization clustered cluster and a modulus of a second initialization clustered cluster by a first constant to result in a quotient, and when a difference of the modulus of the intersection and the quotient is greater than or equal to a second constant, merging the first and second suspected initialization clustered clusters into a suspected initialization clustered cluster.

In an optional implementation mode of the present disclosure, the merging the M pieces of sample data into N initialization clustered clusters according to the acquired inter-sample similarity further comprises: for the obtained multiple suspected initialization clustered clusters, taking each of the suspected initialization clustered clusters that cannot be merged with one another as a respective initialization clustered cluster.

In an optional implementation mode of the present disclosure, the second threshold is determined according to a linear function of a number of pieces of sample data comprised in one or more of the at least two suspected initialization clustered clusters.

In an optional implementation mode of the present disclosure, the method further comprises: performing outlier separation on at least one of the multiple clustered clusters, and taking all clustered clusters obtained by the outlier separation as multiple clustered clusters corresponding to the M pieces of sample data.

In an optional implementation mode of the present disclosure, the outlier separation comprises: for any clustered cluster, obtaining a to-be-outlier cluster and a non to-be-outlier cluster corresponding to each piece of sample data in the clustered cluster, wherein the to-be-outlier cluster corresponding to each piece of sample data comprises the piece of sample data, and the non to-be-outlier cluster comprises other pieces of sample data in the clustered cluster than the piece of sample data; acquiring an inter-cluster similarity between the to-be-outlier cluster and the non to-be-outlier cluster corresponding to each piece of sample data; determining whether a minimum inter-cluster similarity among multiple inter-cluster similarities respectively corresponding to all pieces of sample data in the clustered cluster is less than a third threshold; and taking a to-be-outlier cluster and a non to-be-outlier cluster corresponding to the minimum inter-cluster similarity as two new clustered clusters respectively, in response to the minimum inter-cluster similarity being less than the third threshold.

In an optional implementation mode of the present disclosure, the clustering and merging the N initialization clustered clusters comprises: taking the N initialization clustered clusters as multiple to-be-clustered clusters; acquiring inter-cluster similarities between each to-be-clustered cluster and other to-be-clustered clusters; determining whether a maximum inter-cluster similarity among all inter-cluster similarities corresponding to the multiple to-be-clustered clusters is greater than a fourth threshold;

merging two to-be-clustered clusters corresponding to the maximum inter-cluster similarity to obtain a new to-be-clustered cluster, in response to the maximum inter-cluster similarity being greater than the fourth threshold; and continuing clustering and merging multiple new to-be-clustered clusters constituted by the new to-be-clustered cluster and other to-be-clustered clusters that are not merged this time until no to-be-clustered cluster can be merged.

In an optional implementation mode of the present disclosure, the M pieces of sample data are M images, and the inter-sample similarity between two images comprises a cosine distance between two feature vectors respectively corresponding to the two images.

The present disclosure further provides a clustering apparatus, comprising:

an acquisition unit, configured to acquire a inter-sample similarity between every two pieces of sample data in M pieces of sample data, where M is a positive integer; a merging unit, configured to merge the M pieces of sample data into N initialization clustered clusters according to the acquired inter-sample similarity, where N is a positive integer smaller than M; and a clustering unit, configured to cluster and merge the N initialization clustered clusters to obtain multiple clustered clusters corresponding to the M pieces of sample data.

In an optional implementation mode of the present disclosure, the merging unit comprises: a first merging subunit, configured to merge, for any two pieces of sample data in the M pieces of sample data, the two pieces of sample data into a suspected initialization clustered cluster when the inter-sample similarity of the two pieces of sample data is greater than a first threshold; and a second merging subunit, configured to merge, for the obtained multiple suspected initialization clustered clusters, at least two of the suspected initialization clustered clusters, both comprising a same subset having a number of pieces of sample data, which is greater than or equal to a second threshold, into an initialization clustered cluster.

In an optional implementation mode of the present disclosure, the merging unit is specifically configured to: for any two pieces of sample data in the M pieces of sample data, merge the two pieces of sample data into a suspected initialization clustered cluster when the inter-sample similarity of the two pieces of sample data is greater than a first threshold; and for a first suspected initialization clustered cluster and a second suspected initialization clustered cluster, both comprising a same subset having a number of pieces of sample data, which is greater than or equal to a second threshold, calculating a modulus of an intersection of the first and second suspected initialization clustered clusters, and divide a sum of a modulus of a first initialization clustered cluster and a modulus of a second initialization clustered cluster by a first constant to result in a quotient, and when a difference of the modulus of the intersection and the quotient is greater than or equal to a second constant, merge the first and second suspected initialization clustered clusters into a suspected initialization clustered cluster.

In an optional implementation mode of the present disclosure, the merging unit further comprises: a first acting subunit, configured to take, for the obtained multiple suspected initialization clustered clusters, each of suspected initialization clustered cluster that cannot be merged with one another as a respective initialization clustered cluster.

In an optional implementation mode of the present disclosure, the second threshold is determined according to a linear function of a number of pieces of sample data comprised in one or more of the at least two suspected initialization clustered clusters.

In an optional implementation mode of the present disclosure, the apparatus further comprises:

a separation unit, configured to perform outlier separation on at least one of the multiple clustered clusters, and take all clustered clusters obtained by the outlier separation as multiple clustered clusters corresponding to the M pieces of sample data.

In an optional implementation mode of the present disclosure, the separation unit is specifically configured to perform outlier separation on one of the clustered clusters; the separation unit comprises:

an obtaining subunit, configured to obtain, for any clustered cluster, a to-be-outlier cluster and a non to-be-outlier cluster corresponding to each piece of sample data in the clustered cluster, wherein the to-be-outlier cluster corresponding to each piece of sample data comprises the piece of sample data, and the non to-be-outlier cluster comprises other pieces of sample data in the clustered cluster than the piece of sample data;

a first acquisition subunit, configured to acquire an inter-cluster similarity between the to-be-outlier cluster and the non to-be-outlier cluster corresponding to each piece of sample data;

a first determining subunit, configured to determine whether a minimum inter-cluster similarity among multiple inter-cluster similarities respectively corresponding to all pieces of sample data in the clustered cluster is less than a third threshold; and a first response subunit, configured to take a to-be-outlier cluster and a non to-be-outlier cluster corresponding to the minimum inter-cluster similarity as two new clustered clusters respectively, in response to the minimum inter-cluster similarity being less than the third threshold.

In an optional implementation mode of the present disclosure, the clustering unit comprises:

a second acting subunit, configured to take the N initialization clustered clusters as multiple to-be-clustered clusters;

a second acquisition subunit, configured to acquire inter-cluster similarities between each to-be-clustered cluster and other to-be-clustered clusters;

a second determining subunit, configured to determine whether a maximum inter-cluster similarity among all inter-cluster similarities corresponding to the multiple to-be-clustered clusters is greater than a fourth threshold; and a second response subunit, configured to merge two to-be-clustered clusters corresponding to the maximum inter-cluster similarity to obtain a new to-be-clustered cluster, in response to the maximum inter-cluster similarity being greater than the fourth threshold, and triggering the second acquisition subunit to continue clustering and merging multiple new to-be-clustered clusters constituted by the new to-be-clustered cluster and other to-be-clustered clusters that are not merged this time until no to-be-clustered cluster can be merged.

In an optional implementation mode of the present disclosure, the M pieces of sample data are M images, and the inter-sample similarity between two images comprises a cosine distance between two feature vectors respectively corresponding to the two images.

The present disclosure further discloses an electronic device, comprising: a housing, a processor, a memory, a circuit board, and a power supply circuit, wherein the circuit board is provided inside a space enclosed by the housing, and the processor and the memory are disposed on the circuit board; the power supply circuit is configured to supply power to various circuits or devices of a terminal; the memory is configured to store an executable program code; the processor is configured to read the executable program code stored in the memory to run a program corresponding to the executable program code so as to execute an operation corresponding to the clustering method.

The present disclosure further discloses a non-temporary computer storage medium, capable of storing computer readable instructions. When these instructions are executed, the processor is enabled to execute operations corresponding to the clustering method.

In the present disclosure, when clustering sample data, firstly, the sample data are merged according to an inter-sample similarity between every two pieces of sample data in multiple pieces of sample data, to obtain an initialization clustered cluster, thereby reducing the number of initialization clustered clusters when clustering; and then, clustering and merging are performed according to the initialization clustered cluster at this time, to obtain multiple clustered clusters corresponding to the multiple pieces of sample data, which are beneficial to improve the clustering speed.

BRIEF DESCRIPTION OF THE DRAWINGS

In order to clearly explain the technical solution of the present disclosure or the prior art, the accompanying drawings required to be used in description of the present disclosure or the prior art are briefly introduced in the following, and it is obvious that the accompanying drawings in the following description are merely some embodiments of the present disclosure. Other accompanying drawings can also be obtained according to these accompanying drawings for persons skilled in the art without involving an inventive effort.

DETAILED DESCRIPTION

The technical solutions in the present disclosure are clearly and completely described in combination with the accompanying drawings in the present disclosure, and it is obvious that the described technical solutions are merely part of the technical solutions of the present disclosure rather than all the technical solutions. Based on the technical solution in the present disclosure, all other embodiments obtained by persons skilled in the art without involving an inventive effort are within the scope of protection of the present disclosure.

Figure 1:
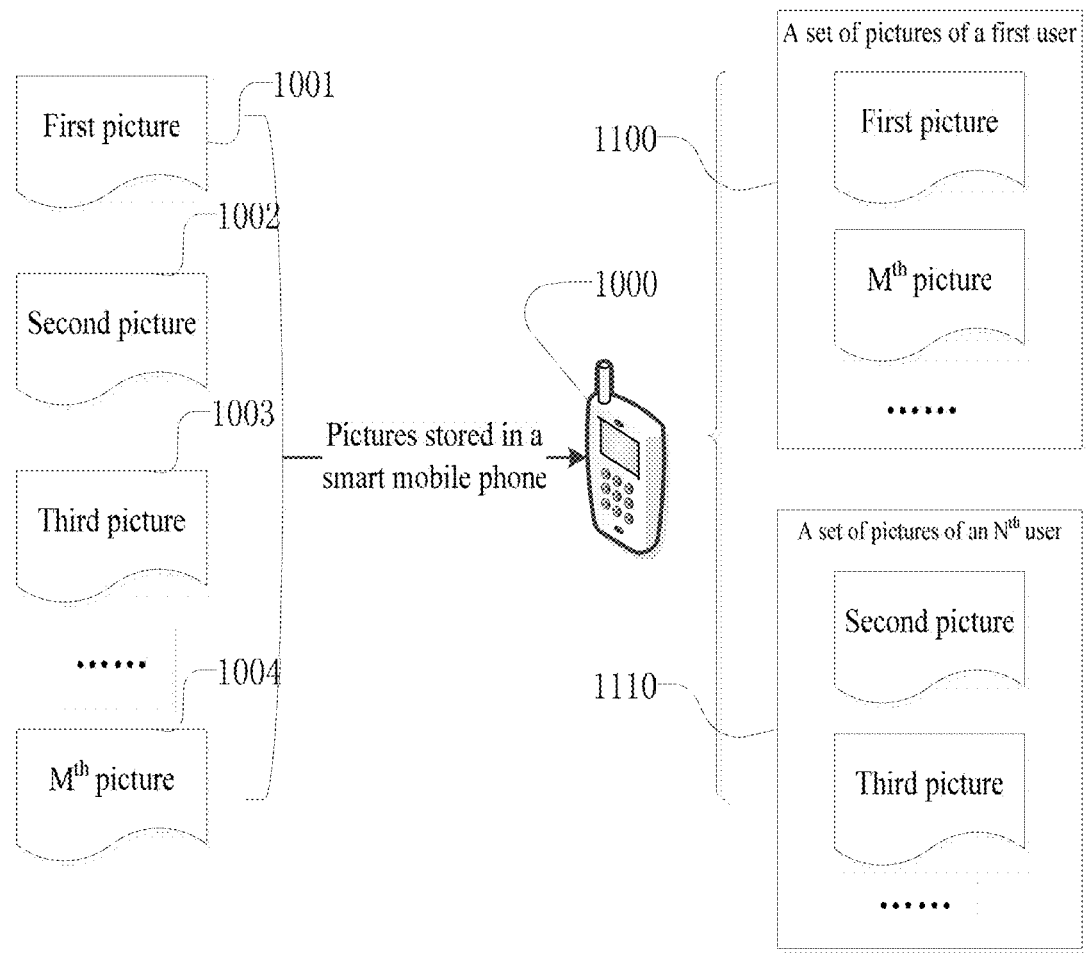
FIG. 1 shows a schematic diagram of an application scenario of the present disclosure.

FIG. 1 schematically shows an application scenario that can be realized in the clustering technical solution provided in the present disclosure.

In FIG. 1, a smart mobile phone 1000 of a user stores multiple pictures, for example, pictures stored in the smart mobile phone 1000 of the user include M pictures, i.e., a first picture 1001, a second picture 1002, a third picture 1003, . . . , and an $M^{th}$ picture 1004, wherein the number of M can be decided according to the number of pictures stored in the smart mobile phone 1000, and in general, M is a positive integer that is greater than or equal to 2. The pictures stored in the smart mobile phone 1000 may include pictures shoot by the user using the smart mobile phone 1000, may also include pictures stored in other terminal devices and transmitted to and stored in the smart mobile phone 1000 by the user, and may further include pictures downloaded from the network by the user using the smart mobile phone 1000, etc.

The technical solution provided in the present disclosure can automatically divide the first picture 1001, the second picture 1002, the third picture 1003, . . . , and the Mth picture 1004 stored in the smart mobile phone 1000 into multiple sets according to a predetermined classification mode; for example, in the case that the predetermined classification mode is dividing according to people in the picture, since both the first picture 1001 and the Mth picture 1004 stored in the smart mobile phone 1000 include the portrait of a first user, and both the second picture 1002 and the third picture 1003 stored in the smart mobile phone 1000 include the portrait of an Nth user, the technical solution provided in the present disclosure can automatically divide the first picture 1001 and the Mth picture 1004 stored in the smart mobile phone 1000 into a set of pictures of the first user, and automatically divide the second picture 1002 and the third picture 1003 stored in the smart mobile phone 1000 into a set of pictures of the Nth user, where the N is a positive integer smaller than M.

By automatically dividing the first picture 1001, the second picture 1002, the third picture 1003, . . . , and the Mth picture 1004 stored in the smart mobile phone 1000 into multiple sets, the present disclosure is beneficial to improve manageability of pictures, so as to facilitate operations of the user, for example, the user can conveniently browse all the pictures including the portrait of the first user stored in the smart mobile phone 1000.

Figure 2:
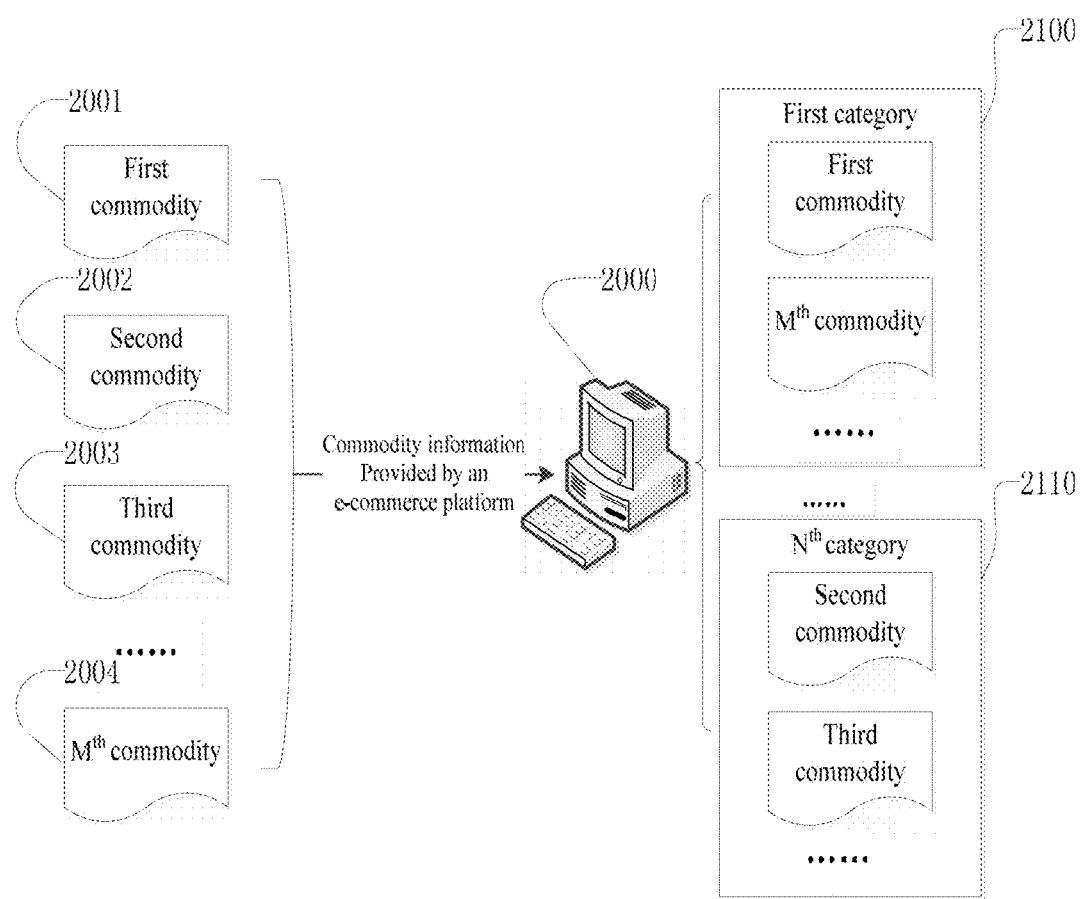
FIG. 2 shows a schematic diagram of another application scenario of the present disclosure.

FIG. 2 schematically shows another application scenario that can be realized in the clustering technical solution provided in the present disclosure.

In FIG. 2, a device 2000 (e.g., a computer or a server) of an e-commerce platform stores all or some of commodity information provided by the e-commerce platform; for example, the commodity information stored in the device 2000 of the e-commerce platform include M pieces of commodity information: first commodity information 2001, second commodity information 2002, third commodity information 2003, . . . , and Mth commodity information 2004, wherein the number of M can be decided according to the number of commodity information stored in the device 2000, and in general, M is a positive integer that is greater than or equal to 2. The commodity information stored in the device 2000 may include: pictures and text description of commodities, etc.

The technical solution provided in the present disclosure can automatically divide the first commodity information 2001, the second commodity information 2002, the third commodity information 2003, . . . , and the Mth commodity information 2004 stored in the device 2000 into multiple sets according to a predetermined classification mode; for example, in the case that the predetermined classification mode is dividing according to the commodity categories, since a commodity corresponding to the first commodity information 2001 stored in the device 2000 and a commodity corresponding to the Mth commodity information 2004 belong to the first category (e.g., a category of lady sneakers), and a commodity corresponding to the second commodity information 2002 stored in the device 2000 and a commodity corresponding to the third commodity information 2003 belong to the Nth category (e.g., a category of baby milk), the technical solution provided in the present disclosure can automatically divide the first commodity information 2001 and the Mth commodity information 2004 stored in the device 2000 into a set of the first category (e.g., a category of lady sneakers), and automatically divide the second commodity information 2002 and the third commodity information 2003 stored in the device 2000 into a set of the Nth category (e.g., a category of baby milk), where the N is a positive integer smaller than M.

By automatically dividing the first commodity information 2001, the second commodity information 2002, the third commodity information 2003, . . . , and the $M^{th}$ commodity information 2004 stored in the device 2000 into multiple sets, the present disclosure is beneficial to improve manageability of commodity information, so as to facilitate operations of the e-commerce platform and customers, for example, in the case that a customer is viewing the first commodity information 2001 stored in the device 2000, the e-commerce platform can recommend and exhibit other commodity information (e.g., the $M^{th}$ commodity information) in the first category set, to which the first commodity information 2001 belongs, to the user.

However, persons skilled in the art can understand that the present disclosure can also be applicable to other application scenarios, i.e., the application scenarios to which the present disclosure is applicable are not limited by the two application scenarios illustrated above.

Detailed introduction is made to the clustering technical solution of the present disclosure through specific embodiments with reference to the accompanying drawings.

Figure 3:
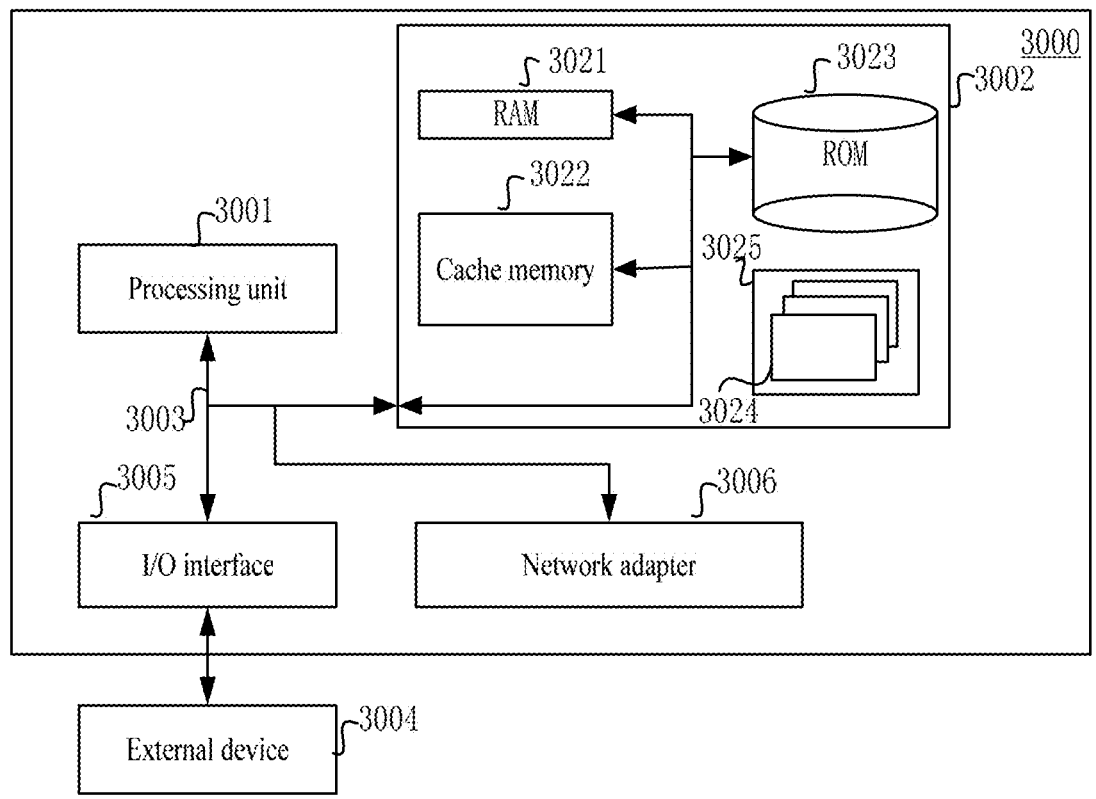
FIG. 3 shows a block diagram of an exemplary device for realizing the present disclosure.

FIG. 3 shows a block diagram applicable to realize the exemplary device 3000 (e.g., a computer system/server) of the present disclosure. The device 3000 illustrated in FIG. 3 is only an example, and should not bring any limitation to the function and use range of the present disclosure.

As shown in FIG. 3, the device 3000 can be represented in the form of a universal computing device. Components of the device 3000 include, but not limited to, one or more processors or processing units 3001, a system memory 3002, and a bus 3003 connecting different system components (including the system memory 3002 and the processing units 3001). The device 3000 may include multiple computer system readable media. These media may be any usable media capable of accessed by the device 3000, including volatile and nonvolatile media, movable and unmovable media, etc.

The system memory 3002 may include a computer system readable medium in the form of a volatile memory, for example, a Random Access Memory (RAM) 3021 and/or a cache memory 3022. The device 3000 may further include other movable/unmovable and volatile/nonvolatile computer system storage media. Only as an example, an ROM 3023 may be configured to read/write an unmovable non-volatile magnetic medium (not shown in FIG. 3, generally called "hard disk drive"). Although not shown in FIG. 3, a disk driver for reading/writing a movable nonvolatile magnetic disk (e.g., "floppy disk") and an optical disk driver for reading/writing a movable nonvolatile optical disk (e.g., CD-ROM, DVD-ROM or other optical media) can be provided. In these cases, each driver may be connected to the bus 3003 through one or more data medium interface. The system memory 3002 may include at least one program product; the program product has a group of (e.g., at least one) program modules configured to execute the functions of the present disclosure.

A program/general utility tool 3025 having a group of (at least one) program modules 3024 can be stored in for example the system memory 3002; the program modules 3024 include, but not limited to, an operating system, one or more application programs, other program modules, and program data; each or certain combination of these examples may include implementation of the network environment. The program module 3024 generally executes the functions and/or method described in the present disclosure.

The device 3000 may also communicate with one or more external devices 3004 (e.g., a keyboard, a pointing device, a display, etc.). Such communication can be conducted by an Input/Output (I/O) interface 3005, and the device 3000 may also communicate with one or more networks (for example, Local Area Network (LAN), Wide Area Network (WAN) and/or public network, e.g., Internet) through a network adapter 3006. As shown in FIG. 3, the network adapter 3006 communicates with other modules (e.g., the processing unit 3001, etc.) of the device 3000 through the bus 3003. It should be understood that although not shown in FIG. 3, other hardware and/or software modules can be used together with the device 3000.

The processing unit 3001 (i.e., the processor) runs a computer program stored in the system memory 3002 so as to execute various function applications and data processing, for example, executing instructions for realizing various steps in the method; specifically speaking, the processing unit 3001 can execute a computer program stored in the system memory 3002, and when the computer program is executed, the following steps are realized: acquiring an inter-sample similarity between every two pieces of sample data in M pieces of sample data, where M is a positive integer; merging the M pieces of sample data into N initialization clustered clusters according to the acquired inter-sample similarity, where N is a positive integer smaller than M; and clustering and merging the N initialization clustered clusters to obtain multiple clustered clusters corresponding to the M pieces of sample data.

Figure 4:
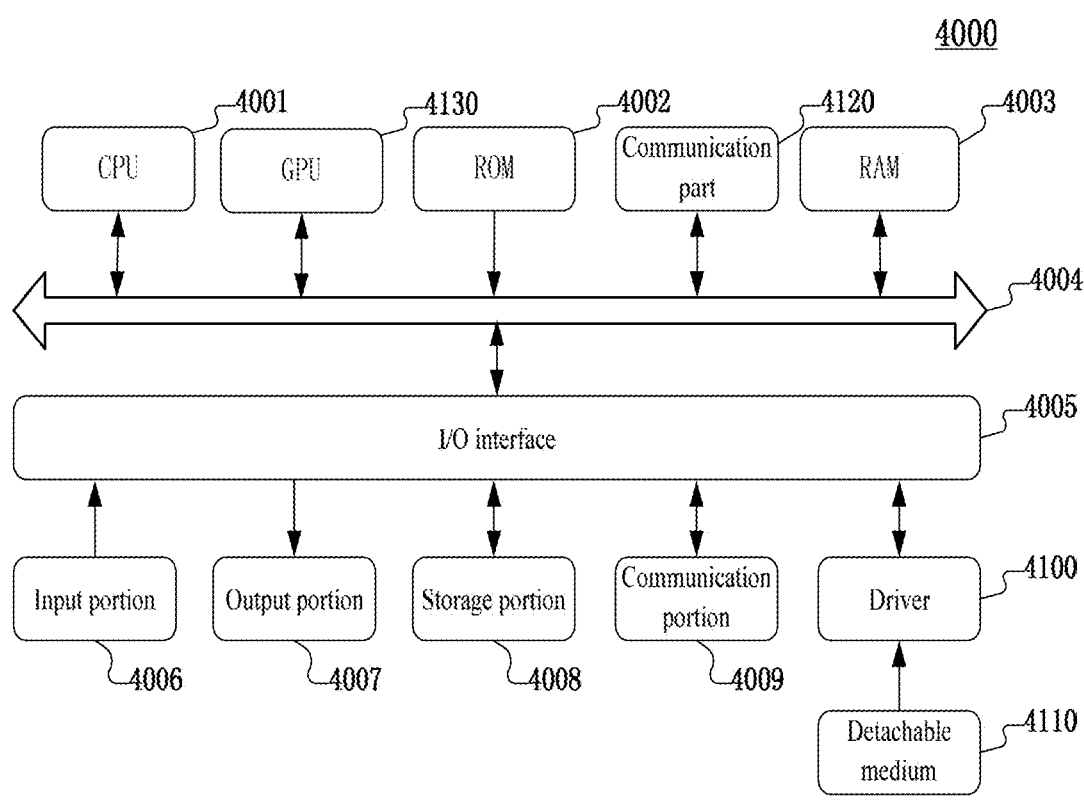
FIG. 4 shows a block diagram of another exemplary device for realizing the present disclosure.

FIG. 4 shows an exemplary device 4000 applicable to realize the present disclosure. The device 4000 may a mobile terminal, a Personal Computer (PC), a tablet computer, and a server etc. In FIG. 4, the device 4000 includes one or more processors and communication parts, etc. The one or more processors may be: one or more Central Processing Units (CPUs) 4001, and/or one or more Graphic Processing Units (GPUs) 4130 etc. The processors can execute various appropriate actions and processing according to executable instructions stored in a Read-Only Memory (ROM) 4002 or executable instructions loaded from a storage portion 4008 to a RAM 4003. The communication part 4120 may include, but not limited to, a network card; the network card may include, but not limited to, an IB (Infiniband) network card. The processor may communicate with the ROM 4002 and/or the RAM 4300 to execute the executable instruction, is connected to the communication part 4120 through the bus 4004, and communicates with other target devices via the communication part 4120, so as to complete corresponding operations in the present disclosure. The operations executed by the processor include: acquiring an inter-sample similarity between every two pieces of sample data in M pieces of sample data, where M is a positive integer; merging the M pieces of sample data into N initialization clustered clusters according to the acquired inter-sample similarity, where N is a positive integer smaller than M; and clustering and merging the N initialization clustered clusters to obtain multiple clustered clusters corresponding to the M pieces of sample data.

In addition, the RAM 4003 may also store various programs and data required for operation of the apparatus. The CPU 4001, the ROM 4002 and the RAM 4003 are connected to each other through the bus 4004. In the presence of the RAM 4003, the ROM 4002 is an optional module. The RAM 4003 stores an executable instruction, or writes the executable instruction in the ROM 4002 during running, and the executable instruction enables the CPU 4001 to execute operations corresponding to the communication method. The I/O interface 4005 is also connected to the bus 4004. The communication parts 4120 may be integrally provided, may also be configured to be provided with multiple sub-modules (for example, multiple IB network cards), and are separately connected to the bus.

The following components are connected to the I/O interface 4005: an input portion 4006 including a keyboard, a mouse, etc.; an output portion 4007 including such as a Cathode Ray Tube (CRT) and a Liquid Crystal Display (LCD); a storage portion 4008 including a hard disk; and a communication portion 4009 of a network interface card including such as an LAN card and a modem. The communication portion 4009 executes communication processing via a network such as the Internet. A driver 4100 is also connected to the I/O interface 4005 as needed. A detachable medium 4110 such as a magnetic disk, an optical disk, a magnetooptical disk and a semiconductor memory is installed on the driver 4100 as needed, so that a computer program read therefrom is installed in the storage portion 4008 as needed.

It should be noted that an architecture as shown in FIG. 4 is only an optical implementation mode; in the specific practice process, selection, deletion, addition or replacement can be made on the number and types of components in FIG. 4 according to actual requirements; an implementation mode such as a separated setting or integrated setting can also be adopted to set different functional components; for example, the GPU and the CPU can be separately set; for another example, the GPU is integrated on the CPU, and the communication parts can be separately set, and can also be integrally set on the CPU or the GPU. These replaceable implementation modes fall within the scope of protection of the present disclosure.

Particularly, according to the embodiment of the present disclosure, the process below described with reference to the flow diagram can be implemented as a computer software program, for example, the embodiment of the present disclosure includes a computer program product, including a computer program tangibly included in a machine readable medium; the computer program includes a program code for executing steps shown in the flow diagram, and the program code may include executable instructions correspondingly executing the steps provided in the present application, for example, an executable instruction for acquiring an inter-sample similarity between every two pieces of sample data in M pieces of sample data, where M is a positive integer; an executable instruction for merging the M pieces of sample data into N initialization clustered clusters according to the acquired inter-sample similarity, where N is a positive integer smaller than M; and an executable instruction for clustering and merging the N initialization clustered clusters to obtain multiple clustered clusters corresponding to the M pieces of sample data.

In such an embodiment, the computer program can be downloaded and installed from the network through the communication portion 4009, and/or installed from the detachable medium 4110. When executed by the CPU 4001, the computer program executes the executable instructions recited in the present disclosure.

The clustering technical solution provided in the present disclosure is illustrated below with reference to FIGS. 5-11. Any one of the clustering technical solutions provided in the present disclosure can be exampled in the form of software, or hardware, or a combination thereof. For example, the clustering technical solution provided in the present disclosure can be implemented by a certain electronic device or a certain processor, which is not limited in the present disclosure. The electronic device may include, but not limited to a terminal or a server, and the processor may include, but not limited to a CPU or a GPU. No more detailed description is provided below.

Figure 5:
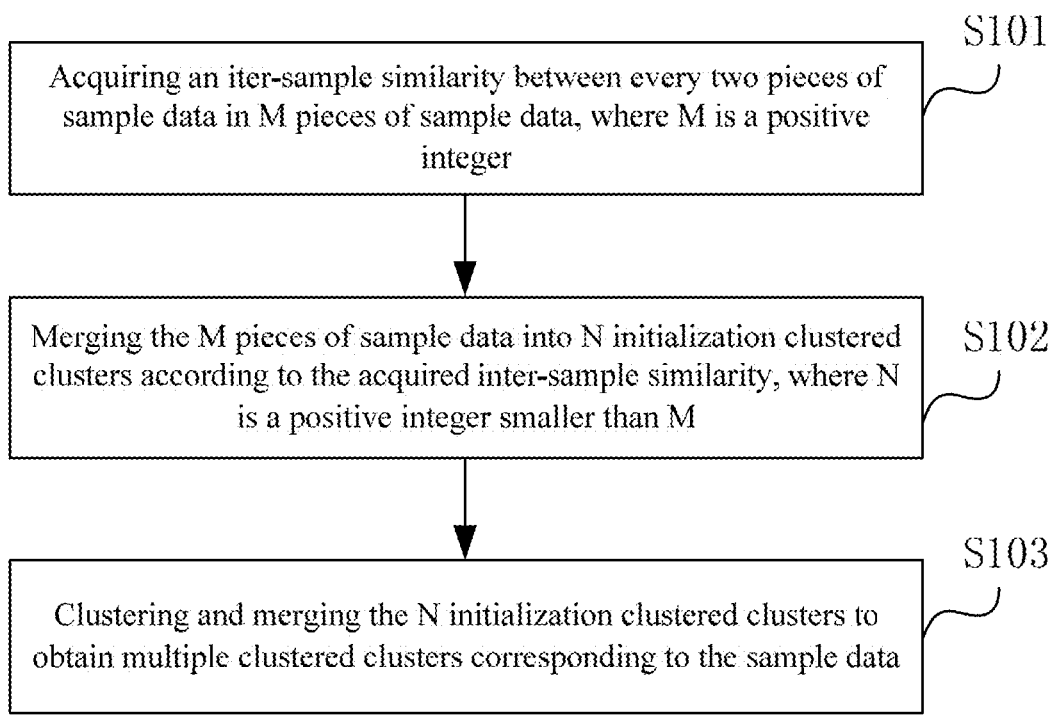
FIG. 5 is a schematic flow diagram of the clustering method provided in the present disclosure.

In FIG. 5, in S101: an inter-sample similarity between every two pieces of sample data in M pieces of sample data is acquired, where M is a positive integer. In general, M is greater than 2, for example, M may be 100, or 1001, or 5107, etc.

In an optional implementation mode, step S101 can be executed by the processor through calling instructions stored in the memory, or can be executed by an acquisition unit 501 run by the processor.

The sample data in the present disclosure can be images (i.e., pictures), voice, video, or text etc.

In an optional implementation mode, after the processor obtains the sample data, the processor can extract features of the sample data by using a convolutional neural network or other traditional local feature descriptors, for example, when the sample data is an image, the processor can perform feature extraction on the image by using Sift (Scale-invariant feature transform), HOG (Histogram of Oriented Gradient) etc., to obtain a feature vector of each piece of sample data; and the processor constructs a feature matrix according to the feature vector of the extracted sample data. Assume that there are n pieces of sample data, m features of each piece of sample data are extracted, an n*m-order feature matrix can be constructed according to the extracted features.

The inter-sample similarity between two pieces of sample data in the present disclosure can be represented by using, not limited to, a cosine distance, a Euclidean distance etc. of the feature vector of the sample data.

For example, after the feature matrix is constructed, the processor can calculate the cosine distance of the features of the sample data to generate a similarity matrix, and here, all features of one piece of sample data act as a feature vector. According to the assumption, the processor generates the n*m-order feature matrix, and the processor can generate an n*n-order similarity matrix according to the feature matrix as follows:

$$M = \begin{pmatrix} M_{11} & \cdots & & & M_{1n} \\ \vdots & \ddots & & & \vdots \\ & & M_{ij} & & \\ & & & \ddots & \\ M_{n1} & \cdots & & & M_{nn} \end{pmatrix}$$

wherein Mij is the inter-sample similarity between the ith sample data and the jth sample data, $$M_{ij} = \cos(X, Y) = \frac{<X, Y>}{|X|*|Y|},$$

X represents the feature vector of the ith sample data, and Y represents the feature vector of the jth sample data.

The similarity matrix is representative of the similarity measure between different pieces of sample data; when the inter-sample similarity of two pieces of sample data is very high (e.g., exceeding a certain set threshold, or the similarity satisfies a certain predetermined condition, etc.), it can be approximately considered that the two pieces of sample data belong to the same category. In addition, the similarity matrix is a symmetric matrix. In the case that the input information of the present disclosure is the similarity matrix of M pieces of sample data, the processor can obtain the similarity matrix of M pieces of sample data through receiving the input information. However, in the case that the input information of the present disclosure is M pieces of sample data, the processor can obtain the similarity matrix of M pieces of sample data by using the solution described above. The present disclosure does not limit the specific implementation mode that the processor obtains the similarity matrix of M pieces of sample data.

In S102, the M pieces of sample data are merged into N initialization clustered clusters according to the acquired inter-sample similarity, where N is a positive integer smaller than M.

In an optional implementation mode, step S102 can be executed by the processor through calling corresponding instructions stored in the memory, or can be executed by a merging unit 502 run by the processor. Each initialization clustered cluster includes at least one piece of sample data.

Before the present disclosure clusters the sample data, it generally needs to determine the initialization clustered cluster of the sample data. In common practice, each piece of sample data is determined as a respective clustered cluster, and these clustered clusters are taken as the initialization clustered clusters; for example, when there are four pieces of sample data, i.e., a, b, c, and d respectively, then four initialization clustered clusters can be determined. This method is based on each piece of sample data and has good robustness, and the obtained final clustering result has good accuracy.

The computing complexity of the method of determining each piece of sample data as a respective initialization clustered cluster and obtaining a final clustering result according to the determined initialization clustered cluster is $O(n^3 \log n)$, wherein n is the number of the pieces of sample data. The method is applicable to the scenario requiring high precision and low speed performance. In the scenario requiring higher speed performance for processing data, the clustering technical solution of the present disclosure reduces the number of the initialization clustered clusters through merging the sample data, benefiting to improving the speed performance of clustering.

In an optional implementation mode, merging the M pieces of sample data into N initialization clustered clusters according to the acquired inter-sample similarity by the processor may include the following steps:

In S01, for one piece of sample data, all pieces of sample data with the inter-sample similarity to the sample data being greater than a first threshold are found out, and merging each of all pieces of found sample data and the sample data into a suspected initialization clustered cluster, so that the processor can obtain multiple suspected initialization clustered clusters.

In an optional implementation mode, step S01 can be executed by the processor through calling corresponding instructions stored in the memory, or can be executed by a first merging subunit run by the processor.

Assume that there are five pieces of sample data, i.e., a, b, c, d and e respectively, and at this time, the processor obtains the inter-sample similarity of a to b, c, d and e respectively, the inter-sample similarity of b to a, c, d and e respectively, the inter-sample similarity of c to a, b, d and e respectively, the inter-sample similarity of d to a, b, c and e respectively, and the inter-sample similarity of e to a, b, c and d respectively.

According to the assumption, when the inter-sample similarity of a to b and d is greater than the first threshold, and the inter-sample similarity of b and c is greater than the first threshold, then the processor can merge a and b into a suspected initialization clustered cluster C1, merge a and d into a suspected initialization clustered cluster C2, and merge b and c into a suspected initialization clustered cluster C3; since the inter-sample similarity of e to other pieces of sample data is less than or equal to the first threshold, the processor can take e as a suspected initialization clustered cluster C4.

It is worth mentioning that the first threshold is optionally a higher threshold, for example, in the case that the value range of the inter-sample similarity is [0, 1], the first threshold may be 0.9, 0.95 etc., thereby ensuring the accuracy of the suspected initialization clustered clusters as far as possible. In addition, the first threshold can be adjusted according to actual condition, for example, in the case that each suspected initialization clustered cluster includes one piece of sample data, the processor can appropriately reduce the first threshold; for another example, in the case that the ratio of the number of the suspected initialization clustered clusters including two pieces of sample data to the number of all suspected initialization clustered clusters is less than a predetermined ratio (e.g., 1/100), the processor can appropriately reduce the first threshold.

In S02, for the obtained multiple suspected initialization clustered clusters, at least two of the suspected initialization clustered clusters, both comprising a same subset having a number of pieces of sample data, which is greater than or equal to a second threshold, are merged into an initialization clustered cluster.

In an optional implementation mode, step S02 can be executed by the processor through calling corresponding instructions stored in the memory, or can be executed by a second merging subunit run by the processor.

In an optional implementation mode, the second threshold can be set as a fixed positive integer; for example, assume that the second threshold is 1, when two suspected initialization clustered clusters include a same piece of sample data, then the processor merges the two suspected initialization clustered clusters; in addition, a suspected initialization clustered cluster that cannot be merged with other suspected initialization clustered clusters is also determined as an initialization clustered cluster; for example, a first acting subunit run by the processor determines a suspected initialization clustered cluster that cannot be merged with other suspected initialization clustered clusters as an initialization clustered cluster.

The inter-sample similarity has transitivity, and therefore, the processor can merge the suspected initialization clustered clusters including the same piece of sample data as an initialization clustered cluster.

According to the assumption in step S01, both the suspected initialization clustered cluster $C_1$ and the suspected initialization clustered cluster $C_2$ include sample data a, and both the suspected initialization clustered cluster $C_1$ and the suspected initialization clustered cluster $C_3$ include sample data b, the processor can merge the suspected initialization clustered cluster $C_1$, the suspected initialization clustered cluster $C_2$ and the suspected initialization clustered cluster $C_3$ into an initialization clustered cluster $C_5$; in addition, the suspected initialization clustered cluster $C_4$ does not include the same piece of sample data as other suspected initialization clustered clusters, the processor does not perform merging on the suspected initialization clustered cluster $C_4$, but determines the suspected initialization clustered cluster $C_4$ as the initialization clustered cluster.

The computing complexity of the clustering technical solution of the present disclosure is $O(n^2 \log n)$, and thus the clustering technical solution greatly improves the computing speed of clustering the sample data to obtain a final clustering result, compared with the computing complexity $O(n^3 \log n)$ of the technical solution of determining each piece of sample data as a respective initialization clustered cluster and obtaining a final clustering result according to the determined initialization clustered cluster.

One approach of merging the suspected initialization clustered clusters in the present disclosure is: merging two suspected initialization clustered clusters as long as the number of the same pieces of sample data included in the two suspected initialization clustered clusters is greater than or equal to the second threshold.

In some situations of actual application, two suspected initialization clustered clusters may not belong to the same category, but the inter-sample similarity between a very few pieces of sample data in the two suspected initialization clustered clusters is greater than the first threshold; that is, since noise point sample data exist in the suspected initialization clustered clusters, the two suspected initialization clustered clusters are merged, and in this way, an error may occur in the stage of determining the initialization clustered cluster.

Figure 6:
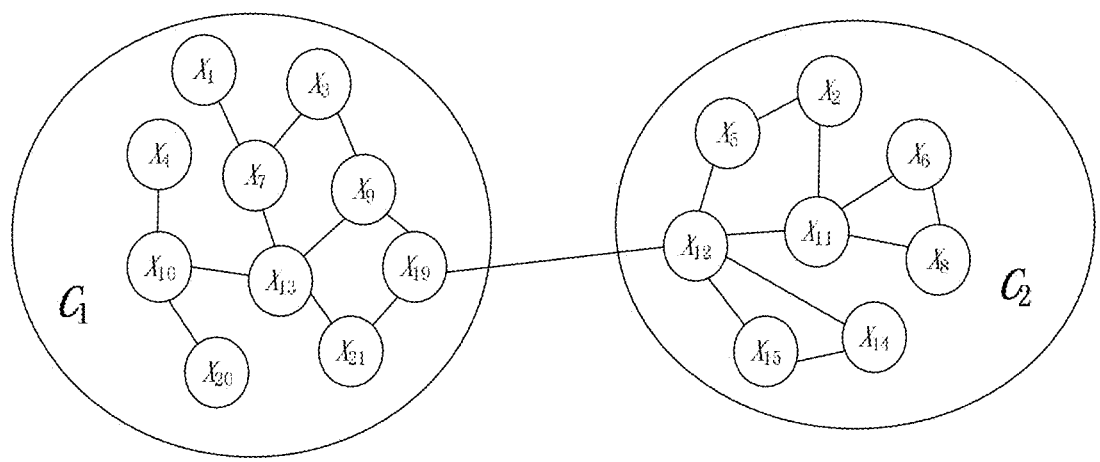
FIG. 6 is a schematic diagram of an inter-cluster similarity between initialization clustered clusters provided in the present disclosure.

As shown in FIG. 6, in FIG. 6, $X_i$ is sample data, a solid line connection between two pieces of sample data represents that the inter-sample similarity between the two pieces of sample data is greater than the first threshold, $X_{19}$ and $X_{12}$ are connected between the suspected initialization clustered cluster $C_1$ and the suspected initialization clustered cluster $C_2$; when the method of merging suspected initialization clustered clusters is adopted, the suspected initialization clustered cluster $C_1$ and the suspected initialization clustered cluster $C_2$ are merged, resulting in that two suspected initialization clustered clusters should not be merged into one suspected initialization clustered cluster; therefore, an error occurs at the stage of determining an initialization clustered cluster.

In order to reduce or even avoid occurrence of an error at the stage of determining an initialization clustered cluster, a second threshold in the present disclosure can be determined according to a linear function of the number of sample data included in one or more of the at least two suspected initialization clustered clusters. For example, assume that slope k is 0.5, when a suspected initialization clustered cluster $C_1$ includes two pieces of sample data, and it is desired to merge $C_1$ with the suspected initialization clustered cluster $C_2$, the second threshold is 1; when the suspected initialization clustered cluster $C_1$ includes four pieces of sample data, and it is desired to merge $C_1$ with the suspected initialization clustered cluster $C_2$, the second threshold is 2, and so on.

Another optional implementation mode of merging suspected initialization clustered clusters of the present disclosure is: two suspected initialization clustered clusters can merely be merged as long as the number of the same pieces of sample data included in the two suspected initialization clustered clusters is greater than or equal to the second threshold, and the two suspected initialization clustered clusters should also satisfy the following formula (1):

$$|S_1 \cap S_2| \geq (|S_1|+|S_2|)/\beta+\gamma; \qquad (1)$$

wherein $S_1$ is a sample data set corresponding to a suspected initialization clustered cluster; in the $S_1$, the inter-sample similarities between one piece of sample data and other pieces of sample data are greater than the first threshold; $S_2$ is another sample data set corresponding to a suspected initialization clustered cluster; in the $S_2$, the inter-sample similarities between one piece of sample data and other pieces of sample data are greater than the first threshold, $\beta$ and $\gamma$ are preset parameters. Optionally, $2 \leq \beta \leq 3$, $-3 \leq \gamma \leq -1$, for example, $\beta=2.5$ and $\gamma=-1$.

The process of merging two suspected initialization clustered clusters is specifically:

judging whether a first suspected initialization clustered cluster and a second suspected initialization clustered cluster satisfy formula (1) or not, wherein the first suspected initialization clustered cluster and the second suspected initialization clustered cluster include the same sample data;

if yes, merging the first suspected initialization clustered cluster and the second suspected initialization clustered cluster into a new suspected initialization clustered cluster, and merging the new suspected initialization clustered cluster with other suspected initialization clustered clusters according to formula (1) again; and if not, refusing to merge the first suspected initialization clustered cluster and the second suspected initialization clustered cluster into a new suspected initialization clustered cluster.

When none of suspected initialization clustered clusters can be merged any more, all the suspected initialization clustered clusters are determined as initialization clustered clusters.

According to the assumption in step S01, since both the suspected initialization clustered cluster $C_1$ and the suspected initialization clustered cluster $C_2$ include sample data a, the processor regards each of the suspected initialization clustered cluster $C_1$ and the suspected initialization clustered cluster $C_2$ as a respective sample data set; when a modulus of an intersection of $C_1$ and $C_2$, a modulus of $C_1$, and a modulus of $C_2$ satisfy formula (1), that is, the following formula is workable:

$$|C1 \cap C2| \geq (|C1|+|C2|)/\beta+\gamma,$$

then the processor merges the suspected initialization clustered cluster C1 and the suspected initialization clustered cluster C2 into a new suspected initialization clustered cluster C5, and at this time, the suspected initialization clustered cluster C5 includes sample data a, sample data b, and sample data d, while the suspected initialization clustered cluster C3 includes sample data b and sample data c; since both the suspected initialization clustered cluster C5 and the suspected initialization clustered cluster C3 include sample data b, the process judges again whether the suspected initialization clustered cluster C5 and the suspected initialization clustered cluster C3 satisfy formula (1) or not;

if not, the processor refuses to merge the suspected initialization clustered cluster C5 and the suspected initialization clustered cluster C3; since the suspected initialization clustered cluster C4 includes sample data e, and the suspected initialization clustered cluster C4 does not include the same sample data as the suspected initialization clustered cluster C5 and the suspected initialization clustered cluster C3, the processor determines the suspected initialization clustered cluster C5, the suspected initialization clustered cluster C3, and the suspected initialization clustered cluster C4 as initialization clustered clusters, respectively.

When the modulus of the intersection of C1 and C2, the modulus of C1, and the modulus of C2 dissatisfy formula (1), then the processor refuses to merge the suspected initialization clustered cluster C1 and the suspected initialization clustered cluster C2; since both the suspected initialization clustered cluster C1 and the suspected initialization clustered cluster C3 includes sample data b, the processor judges again whether the suspected initialization clustered cluster C1 and the suspected initialization clustered cluster C3 satisfy formula (1) or not; assume that the suspected initialization clustered cluster C1 and the suspected initialization clustered cluster C3 still dissatisfy formula (1), and moreover, the suspected initialization clustered cluster C4 includes sample data e, and the suspected initialization clustered cluster C4 does not include the same sample data as the suspected initialization clustered cluster C1, the suspected initialization clustered cluster C2 and the suspected initialization clustered cluster C3, the processor does not perform merging on the suspected initialization clustered cluster C4, and the processor determines the suspected initialization clustered cluster C1, the suspected initialization clustered cluster C2, the suspected initialization clustered cluster C3 and the suspected initialization clustered cluster C4 as initialization clustered clusters, respectively.

In the present disclosure, two suspected initialization clustered clusters are merged in the case that the number of same pieces of sample data included in the two suspected initialization clustered clusters is greater than or equal to the second threshold, and formula (1) is satisfied; the condition of ($|S_1 \cap S_2|$) is considered in the process of merging two suspected initialization clustered clusters. Therefore, the present disclosure is beneficial to improve the accuracy of initialization clustered cluster and improve the robustness of the whole clustering technology.

In S103, the N initialization clustered clusters are clustered and merged to obtain multiple clustered clusters corresponding to the M pieces of sample data.

In an optional implementation mode, step S103 can be executed by the processor through calling corresponding instructions stored in the memory, or can be executed by a merging unit 503 run by the processor.

Figure 7:
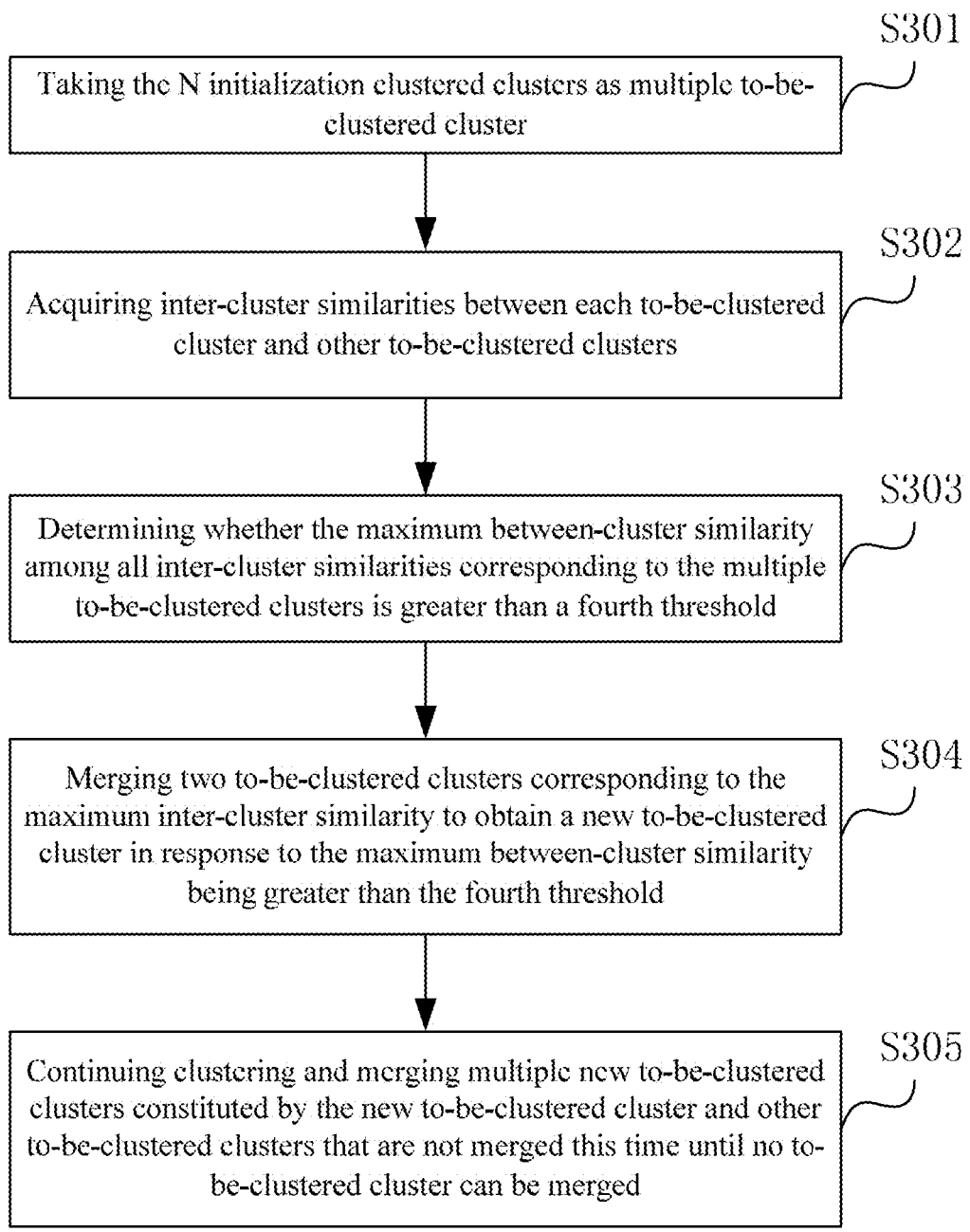
FIG. 7 is a schematic flow diagram of the method of clustering and merging initialization clustered clusters provided in the present disclosure.

In an optional implementation mode, with reference to FIG. 7, the clustering and merging the N initialization clustered clusters may include the following steps:

In S301, the N initialization clustered clusters are taken as multiple to-be-clustered clusters.

In an optional implementation mode, step S301 can be executed by the processor through calling corresponding instructions stored in the memory, or can be executed by a second acting subunit run by the processor.

In S302, inter-cluster similarities between each to-be-clustered cluster and other to-be-clustered clusters are acquired.

In an optional implementation mode, step S302 can be executed by the processor through calling corresponding instructions stored in the memory, or can be executed by a second acquisition subunit run by the processor.

Figure 8:
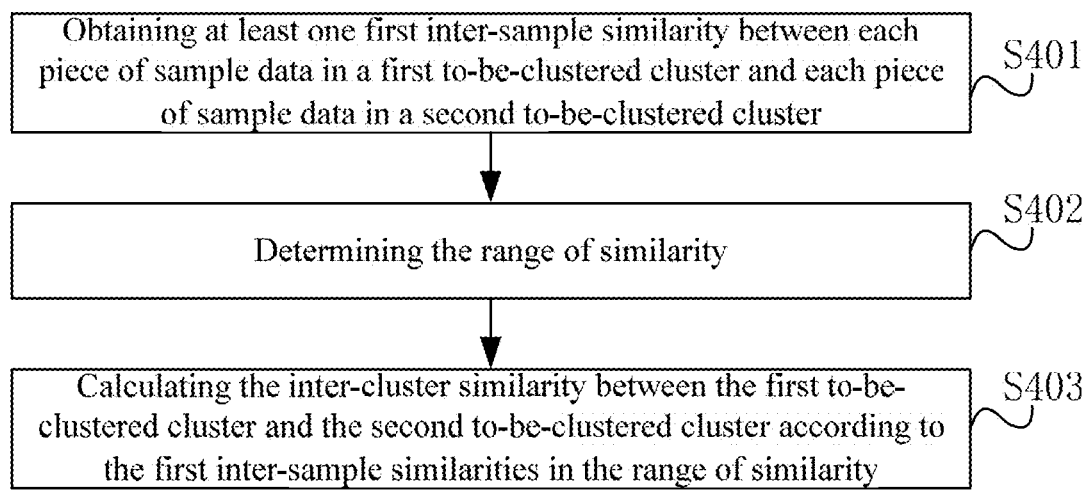
FIG. 8 is a schematic flow diagram of the method of determining an inter-cluster similarity provided in the present disclosure.

When the processor (e.g., the second acquisition subunit) calculates the inter-cluster similarity between every two to-be-clustered clusters, reference can be made to FIG. 8. FIG. 8 is a schematic flow diagram of the method of determining an inter-cluster similarity provided in the present disclosure. The method includes the following steps:

In S401, at least one first inter-sample similarity between each piece of sample data in a first to-be-clustered cluster and each piece of sample data in a second to-be-clustered cluster are obtained.

Assume that sample data a and b are included in the first to-be-clustered cluster, and sample data c and d are included in the second to-be-clustered cluster, then the determined first inter-sample similarities include: an inter-sample similarity between a and c, an inter-sample similarity between a and d, an inter-sample similarity between b and c, and an inter-sample similarity between b and d.

In S402, the range of similarity is determined.

The minimum value of the range of similarity is greater than the minimum inter-sample similarity among the first inter-sample similarities, and the maximum value of the range of similarity is less than the maximum inter-sample similarity among the first inter-sample similarities. In an actual application, the sample data corresponding to a larger value and a smaller value in the first inter-sample similarities is likely to be noise point data generally. Therefore, when determining the range of similarity, an intermediate range in the first inter-sample similarities may be taken as the range of similarity and the inter-cluster similarity between two to-be-clustered clusters may be calculated according to the first inter-sample similarities in the range of similarity, so as to remove the influence of the noise point data to the accuracy of inter-cluster similarity between two to-be-clustered clusters at the greatest extent, thereby improving the accuracy of the final clustering result.

Assume that the first inter-sample similarities obtained by the processor are: 0.2, 0.32, 0.4, 0.3, 0.7, 0.5, 0.75, 0.8, 0.9, 0.92; and at this time, the range of similarity determined by the processor may be 0.3-0.75, or may be 0.4-0.7, or may certainly be other ranges of similarity satisfying the condition, which is not limited in the present disclosure.

In a specific implementation mode, the processor can determine the range of similarity in the following ways:

the processor ranks the obtained first inter-sample similarities, e.g., $e1 \geq e2 \geq e3 \geq \ldots \geq eE$, wherein E is the number of the obtained first inter-sample similarities, and e is the first inter-sample similarity; and the processor determines the range of similarity according to parameters l and k; here, optionally, parameter l may be 0.2E, and parameter k may be 0.8E.

According to the assumption, the processor ranks the obtained first inter-sample similarities, i.e., $0.2 < 0.3 < 0.32 < 0.4 < 0.5 < 0.7 < 0.75 < 0.8 < 0.9 < 0.92$; the processor determines that $l=2$ and $k=8$ according to the number of the first inter-sample similarities $E=10$, and at this time, the range of similarity determined by the processor can be 0.3-0.9.

In S403, the inter-cluster similarity between the first to-be-clustered cluster and the second to-be-clustered cluster is calculated according to the first inter-sample similarities in the range of similarity.

Specifically, the processor can calculate the inter-cluster similarity between the first to-be-clustered cluster and the second to-be-clustered cluster according to the following formula:

$$\sum_{i=l}^{k} \alpha^{j} e_i \bigg/ \sum_{i=l}^{k} \alpha^{j}$$

wherein α is a preset parameter, optionally, 0.85<α<0.95; $e_i$ is the $i^{th}$ first inter-sample similarity from the minimum value (or the maximum value) after the obtained first inter-sample similarities are ranked in an ascending order, l and k are determined parameters.

In S303, it is determined whether the maximum inter-cluster similarity among all inter-cluster similarities corresponding to the multiple to-be-clustered clusters is greater than a fourth threshold.

In an optional implementation mode, step S303 can be executed by the processor through calling corresponding instructions stored in the memory, or can be executed by a second determining subunit run by the processor.

Optionally, the fourth threshold may be in the range of 0.75-0.95. When the inter-cluster similarity is greater than the fourth threshold, it indicates that two to-be-clustered clusters corresponding to the inter-cluster similarity is very similar, and it can be considered that the two to-be-clustered clusters belong to one category, and the two to-be-clustered clusters are merged.

In S304, two to-be-clustered clusters corresponding to the maximum inter-cluster similarity are merged to obtain a new to-be-clustered cluster in response to that the maximum inter-cluster similarity is greater than the fourth threshold.

In an optional implementation mode, step S304 can be executed by the processor through calling corresponding instructions stored in the memory, or can be executed by a second response subunit run by the processor.

In S305, clustering and merging multiple new to-be-clustered clusters constituted by the new to-be-clustered cluster and other to-be-clustered clusters that are not merged this time are continued until no to-be-clustered cluster can be merged; that is, steps S302 to S304 are repeated until no to-be-clustered cluster can be merged.

Assume that the current inter-cluster similarities obtained through calculation are: 0.85, 0.92, 0.7, 0.6, 0.95, and the maximum current inter-cluster similarity obtained therefrom is 0.95, setting the fourth threshold to be 0.75, since 0.95>0.75, merging two to-be-clustered clusters corresponding to 0.95 into a new to-be-clustered cluster, and returning to step S302, continuing acquiring the inter-cluster similarities between each to-be-clustered cluster and other to-be-clustered clusters until the maximum inter-cluster similarity is less than or equal to the fourth threshold, that is, until no to-be-clustered clusters can be merged. At this time, the current multiple to-be-clustered clusters can act as multiple clustered clusters corresponding to the multiple pieces of sample data.

Since the sample data per se has certain noise, and there are some factors influencing the robustness of the clustering result in the clustering process, wrongly clustering some pieces of sample data may be caused in the final clustering result. In order to make the final presented clustering result more accurately, after obtaining multiple clustered clusters corresponding to the multiple pieces of sample data, the processor can also perform outlier separation on each of the multiple clustered clusters to obtain a clustering result of the optimized multiple pieces of sample data. In an optional implementation mode, an operation of performing outlier separation on each of the multiple clustered clusters can be executed by the processor through calling corresponding instructions stored in the memory, or can be executed by a separation unit 601 run by the processor.

Taking an outlier separation of a clustered cluster C1 for example, the separation process includes the following steps:

In S31, a to-be-outlier cluster and a non to-be-outlier cluster corresponding to each piece of sample data in the clustered cluster $C_1$ are obtained.

In an optional implementation mode, step S31 can be executed by the processor through calling corresponding instructions stored in the memory, or can be executed by an obtaining subunit run by the processor.

The to-be-outlier cluster corresponding to sample data X includes sample data X, and the non to-be-outlier cluster corresponding to sample data X includes other pieces of sample data in the clustered cluster $C_1$ except sample data X.

Assume that the clustered cluster $C_1$ includes the following pieces of sample data: $X_1$, $X_2$, $X_3$ and $X_4$, then a to-be-outlier cluster corresponding to $X_1$ is $\{X_1\}$, and a non to-be-outlier cluster corresponding to $X_1$ is $\{X_2, X_3, X_4\}$; a to-be-outlier cluster corresponding to $X_2$ is $\{X_2\}$, and a non to-be-outlier cluster corresponding to $X_2$ is $\{X_1, X_3, X_4\}$; a to-be-outlier cluster corresponding to $X_3$ is $\{X_3\}$, and a non to-be-outlier cluster corresponding to $X_3$ is $\{X_1, X_2, X_4\}$; and a to-be-outlier cluster corresponding to $X_4$ is $\{X_4\}$, and a non to-be-outlier cluster corresponding to $X_4$ is $\{X_1, X_2, X_3\}$.

In S32, an inter-cluster similarity between the to-be-outlier cluster and the non to-be-outlier cluster corresponding to each piece of sample data are acquired.

In an optional implementation mode, step S32 can be executed by the processor through calling corresponding instructions stored in the memory, or can be executed by a first acquisition subunit run by the processor.

In S33, it is determined whether the minimum inter-cluster similarity in multiple inter-cluster similarities respectively corresponding to all pieces of sample data in the clustered cluster $C_1$ is less than a third threshold.

In an optional implementation mode, step S33 can be executed by the processor through calling corresponding instructions stored in the memory, or can be executed by a first determining subunit run by the processor.

Here, the third threshold may be in the range of 0.3-0.5. When the minimum inter-cluster similarity is less than the third threshold, it is indicated that the to-be-outlier cluster and the non to-be-outlier cluster corresponding to the inter-cluster similarity are very different, and it can be understood that the to-be-outlier cluster and the non to-be-outlier cluster do not belong to the same category, the sample data included in the to-be-outlier cluster is an outlier to the non to-be-outlier cluster, and the processor needs to separate the to-be-outlier cluster from the non to-be-outlier cluster.

In S34, a to-be-outlier cluster and a non to-be-outlier cluster corresponding to the minimum inter-cluster similarity are taken as two new clustered clusters respectively in response to the minimum inter-cluster similarity being less than the third threshold.

In an optional implementation mode, step S34 can be executed by the processor through calling corresponding instructions stored in the memory, or can be executed by a first response subunit run by the processor.

In S35, an outlier separation on the clustered cluster corresponding to the non to-be-outlier cluster are continued to be performed, steps S32 to S34 are repeated until no sample data in the clustered cluster can be separated.

According to the example in S31, assume that the inter-cluster similarities calculated by the processor are: 0.25, 0.2, 0.7, 0.5, the minimum inter-cluster similarity obtained therefrom is 0.2 (the to-be-outlier cluster corresponding to 0.2 is {X2}, the third threshold is 0.3, since 0.2<0.3, the processor can determine the to-be-outlier cluster {X2} as the outlier, and the processor takes the to-be-outlier cluster and the non to-be-outlier cluster corresponding to 0.2 as two new clustered clusters, respectively, i.e., a clustered cluster {X2} and a clustered cluster {X1, X3, X4}; the processor continues performing outlier separation on the clustered cluster {X1, X3, X4} until the minimum inter-cluster similarity is greater than or equal to the third threshold, that is, until no sample data can be separated.

According to the technical solution shown in FIGS. 5-8, when clustering the sample data, the processor firstly merges the sample data according to an inter-sample similarity between every two pieces of sample data in multiple pieces of sample data to obtain an initialization clustered cluster, thus reducing the number of initialization clustered clusters when clustering, and then, the processor clusters and merges according to the initialization clustered cluster at this time to obtain multiple clustered clusters corresponding to the multiple pieces of sample data, thereby effectively improving the clustering speed.

Figure 9:
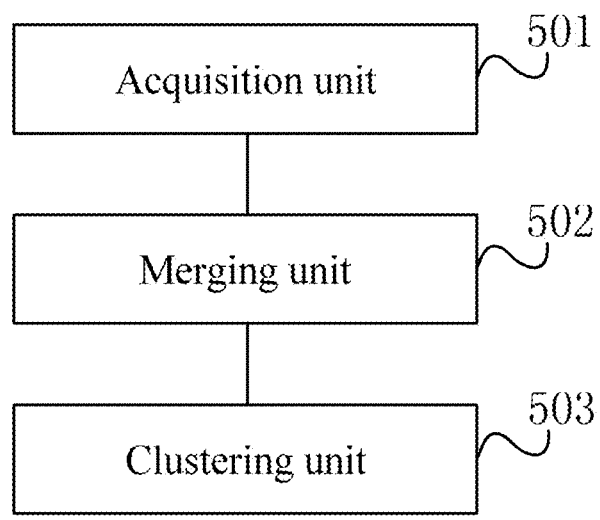
FIG. 9 is a structural schematic diagram of the clustering apparatus provided in the present disclosure.

With reference to FIG. 9, the apparatus includes: an acquisition unit 501, a merging unit 502, and a clustering unit 503.

The acquisition unit 501 is configured to acquire an inter-sample similarity between every two pieces of sample data in M pieces of sample data, where M is a positive integer.

The merging unit 502 is configured to merge the M pieces of sample data into N initialization clustered clusters according to the acquired inter-sample similarity, where N is a positive integer smaller than M.

The clustering unit 503 is configured to cluster and merge the N initialization clustered clusters to obtain multiple clustered clusters corresponding to the M pieces of sample data.

In an optional implementation mode, the merging unit 502 may include: a first merging subunit and a second merging subunit.

The first merging subunit (not shown in FIG. 9) is configured to merge, for any two pieces of sample data in the M pieces of sample data, the two pieces of sample data into a suspected initialization clustered cluster when the inter-sample similarity of the two pieces of sample data is greater than a first threshold; and The second merging subunit (not shown in FIG. 9) is configured to merge, for the obtained multiple suspected initialization clustered clusters, at least two of the suspected initialization clustered clusters, both comprising a same subset having a number of pieces of sample data, which is greater than or equal to a second threshold, into an initialization clustered cluster.

In an optional implementation mode, the merging unit 502 may further include: a first acting subunit.

The first acting subunit (not shown in FIG. 9) is configured to take, for the obtained multiple suspected initialization clustered clusters, each of suspected initialization clustered cluster that cannot be merged with one another as a respective initialization clustered cluster.

In an optional implementation mode, the second threshold is determined according to a linear function of a number of pieces of sample data comprised in one or more of the at least two suspected initialization clustered clusters.

Figure 10:
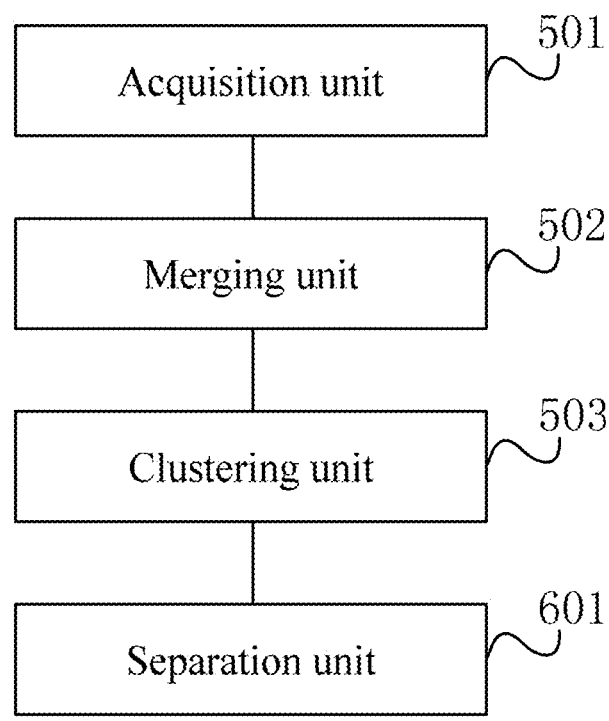
FIG. 10 is a structural schematic diagram of the clustering apparatus provided in the present disclosure.

In an optional implementation mode, with reference to FIG. 10, on the basis of the apparatus shown in FIG. 9, the apparatus may further include: a separation unit 601.

The separation unit 601 is configured to perform outlier separation on each of the multiple clustered clusters to obtain a clustering result of the optimized multiple pieces of sample data.

In an optional implementation mode, the separation unit 601 is specifically configured to perform outlier separation on one of the clustered clusters.

The separation unit may include: an obtaining subunit, a first acquisition subunit and a first determining subunit.

The obtaining subunit (not shown in FIG. 10) is configured to obtain a to-be-outlier cluster and a non to-be-outlier cluster corresponding to each piece of sample data in the clustered cluster, wherein the to-be-outlier cluster corresponding to each piece of sample data includes the sample data, and the non to-be-outlier cluster includes other pieces of sample data in the clustered cluster except the sample data.

The first acquisition subunit (not shown in FIG. 10) is configured to acquire a inter-cluster similarity between the to-be-outlier cluster and the non to-be-outlier cluster corresponding to each piece of sample data.

The first determining subunit (not shown in FIG. 10) is configured to determine whether the minimum inter-cluster similarity in multiple inter-cluster similarities respectively corresponding to all pieces of sample data in the clustered cluster is less than a third threshold.

The first response subunit (not shown in FIG. 10) is configured to use a to-be-outlier cluster and a non to-be-outlier cluster corresponding to the minimum inter-cluster similarity as two new clustered clusters respectively in response to the minimum inter-cluster similarity being less than the third threshold, and trigger the obtaining subunit to continue performing outlier separation on the clustered cluster corresponding to the non to-be-outlier cluster until no clustered cluster can be separated.

In an optional implementation mode, the clustering unit 503 may include: a second acting subunit, a second acquisition subunit, a second determining subunit and a second response subunit.

The second acting subunit (not shown in FIG. 9) is configured to take the N initialization clustered clusters as multiple to-be-clustered clusters.

The second acquisition subunit (not shown in FIG. 9) is configured to acquire inter-cluster similarities between each to-be-clustered cluster and other to-be-clustered clusters.

The second determining subunit (not shown in FIG. 9) is configured to determine whether the maximum inter-cluster similarity among all inter-cluster similarities corresponding to the multiple to-be-clustered clusters is greater than a fourth threshold.

The second response subunit (not shown in FIG. 9) is configured to merge two to-be-clustered clusters corresponding to the maximum inter-cluster similarity to obtain a new to-be-clustered cluster in response to the maximum inter-cluster similarity being greater than the fourth threshold, and trigger the second acquisition subunit to continue clustering and merging multiple new to-be-clustered clusters constituted by the new to-be-clustered cluster and other to-be-clustered clusters that are not merged this time until no to-be-clustered cluster can be merged.

In an optional implementation mode, the M pieces of sample data are M images.

In an optional implementation mode, the inter-sample similarity between two images includes a cosine distance between two feature vectors respectively corresponding to the two images.

According to FIG. 9, when clustering sample data, firstly, the sample data are merged according to an inter-sample similarity between every two pieces of sample data in multiple pieces of sample data to obtain an initialization clustered cluster, thus reducing the number of initialization clustered clusters when clustering, and then, clustering and merging are performed according to the initialization clustered cluster at this time to obtain multiple clustered clusters corresponding to the multiple pieces of sample data, thus effectively improving the clustering speed.

Figure 11:
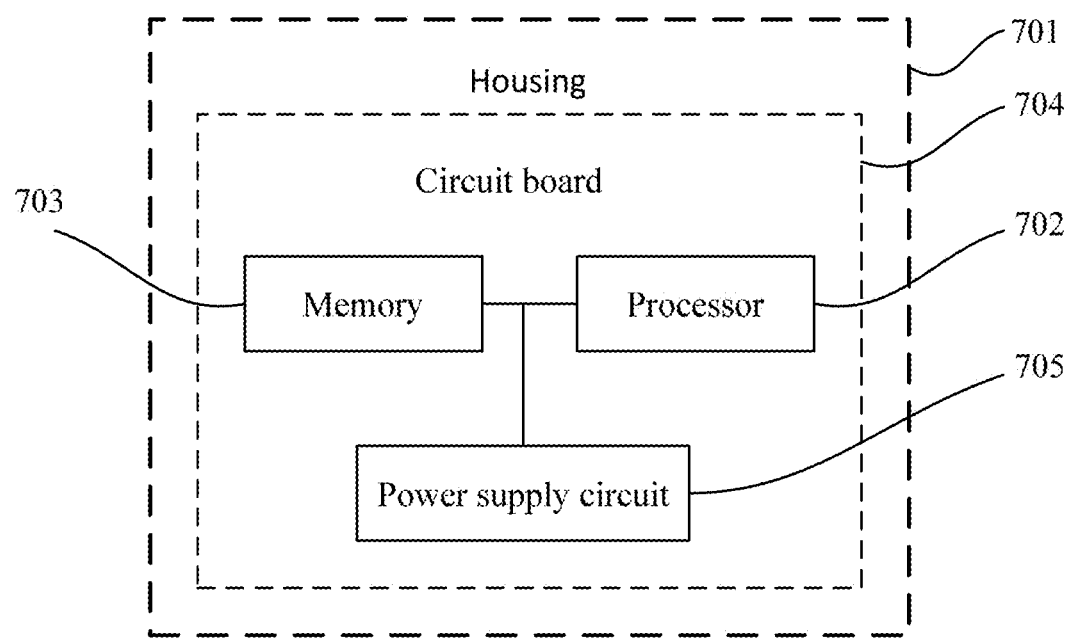
FIG. 11 is a structural schematic diagram of the electronic device provided in the present disclosure.

With reference to FIG. 11, FIG. 11 is a structural schematic diagram of an electronic device provided in the present disclosure. The electronic device includes: a housing 701, a processor 702, a memory 703, a circuit board 704, and a power supply circuit 705, wherein the circuit board 704 is provided inside a space enclosed by the housing 701, and the processor 702 and the memory 703 are disposed on the circuit board 704; the power supply circuit 705 is configured to supply power to various circuits or devices of the electronic device; the memory 703 is configured to store an executable program code; the processor 702 is configured to read the executable program code stored in the memory 703 to run a program corresponding to the executable program code so as to execute the following steps:

acquiring a inter-sample similarity between every two pieces of sample data in M pieces of sample data, where M is a positive integer;

merging the M pieces of sample data into N initialization clustered clusters according to the acquired inter-sample similarity, where N is a positive integer smaller than M; and clustering and merging the N initialization clustered clusters to obtain multiple clustered clusters corresponding to the M pieces of sample data.

Reference is made to the description of the present disclosure with respect to FIGS. 5-11 for the specific execution process of the processor 702 to the steps above and the steps further executed by the processor 702 through running the executable program code. No more detailed description is provided herein.

In the present disclosure, when clustering sample data, firstly, the sample data are merged according to an inter-sample similarity between every two pieces of sample data in multiple pieces of sample data to obtain an initialization clustered cluster, thus reducing the number of initialization clustered clusters when clustering, and then, clustering and merging are performed according to the initialization clustered cluster at this time to obtain multiple clustered clusters corresponding to the multiple pieces of sample data, which are beneficial to improve the clustering speed.

The electronic device exists in various forms, including, but not limited to:

(1) a mobile communication device: the characteristics of this type of device are: having a mobile communication function, and taking voice providing and data communication as the main targets. This type of terminal includes: smart phone (e.g., iPhone), multimedia phone, functional phone, and cheap handsets etc.

(2) an Ultra Mobile PC (UMPC) device: this type of device belongs to the scope of PCs, has computing and processing functions, and generally has the mobile Internet access characteristic. This type of terminal includes: PDA, MID, and UMPC device etc., for example iPad.

(3) a portable entertainment device: this type of device can display and play multimedia content. This type of device includes: an audio/video player (e.g., iPod), a handheld game console, an e-book reader, an intelligent toy, and a portable vehicle navigation device.

(4) a server: a device providing a computing service; the server consists of a processor, a hard disk, a memory, and a system bus etc.; the server is similar to a general-purpose computer in architecture, but has higher requirements in processing capability, stability, reliability, security, expandability, and manageability since providing a high reliable service is required.

(5) other electronic apparatuses having data interactive function.

For embodiments of an apparatus and an electronic device, since the embodiments are basically similar to method embodiments, the embodiments are simply described. Please refer to the description of the method embodiments above for related part.

It should be noted that in the text, the relational terms such as first and second are merely configured to distinguish one entity or operation from another entity or operation, and do not necessarily require or imply any actual relationship or sequence among these entities or operations. Moreover, the terms "include", "comprise" or any other variants thereof are intended to cover non-exclusive comprising, so that the process, method, article or device including a series of factors not only include those factors, but also include other factors that are not explicitly listed, or further include inherent factors of the process, method, article or device. In the case of less limitation, the factor defined by the statement "including one . . . " shall not exclusive of existence of another same factor in the process, method, article or device including the factor.

A person skilled in the art can understand that all or some of the steps for realizing the method embodiments above can be accomplished with a program to instruct related hardware; the program can be stored in a computer readable storage medium; and the storage medium herein is for example a ROM/RAM, a diskette, and an optical disk etc.

The foregoing descriptions are merely preferred embodiments of the present disclosure, but are not intended to limit the scope of protection of the present disclosure. Any modification, equivalent replacement and improvement made within the spirit and principle of the present disclosure shall fall within the scope of protection of the present disclosure.

The invention claimed is:

1. A method for image clustering, comprising:

acquiring an inter-sample similarity between every two pieces of sample data in M pieces of sample data, where M is a positive integer and the M pieces of sample data are M images;

merging the M pieces of sample data into N initialization clustered clusters according to the acquired inter-sample similarity, where N is a positive integer smaller than M and each of the N initialization clustered clusters comprises at least one piece of sample data; and clustering and merging the N initialization clustered clusters to obtain multiple clustered clusters corresponding to the M pieces of sample data;

wherein the acquiring an inter-sample similarity between every two pieces of sample data in the M pieces of sample data comprises:

for each of the M images, performing feature extraction to obtain a feature vector of the image; and determining an inter-sample similarity between every two of the M images based on feature vectors of the two images; and wherein the merging the M pieces of sample data into N initialization clustered clusters according to the acquired inter-sample similarity comprises:

for any two pieces of sample data in the M pieces of sample data, merging the two pieces of sample data into a suspected initialization clustered cluster when the inter-sample similarity of the two pieces of sample data is greater than a first threshold, so as to obtain multiple suspected initialization clustered clusters; and for the obtained multiple suspected initialization clustered clusters, merging at least two of the suspected initialization clustered clusters, both comprising a same subset having a number of pieces of sample data, which is greater than or equal to a second threshold, into an initialization clustered cluster.

2. The method according to claim 1, wherein the merging the M pieces of sample data into N initialization clustered clusters according to the acquired inter-sample similarity further comprises:

for the obtained multiple suspected initialization clustered clusters, taking each of the suspected initialization clustered clusters that cannot be merged with one another as a respective initialization clustered cluster.

3. The method according to claim 1, wherein the second threshold is determined according to a linear function of a number of pieces of sample data comprised in one or more of the at least two suspected initialization clustered clusters.

4. The method according to claim 1, further comprising: performing outlier separation on at least one of the multiple clustered clusters, and taking all clustered clusters obtained by the outlier separation as multiple clustered clusters corresponding to the M pieces of sample data.

5. The method according to claim 4, wherein the outlier separation comprises:

for any clustered cluster, obtaining a to-be-outlier cluster and a non to-be-outlier cluster corresponding to each piece of sample data in the clustered cluster, wherein the to-be-outlier cluster corresponding to each piece of sample data comprises the piece of sample data, and the non to-be-outlier cluster comprises other pieces of sample data in the clustered cluster than the piece of sample data;

acquiring an inter-cluster similarity between the to-be-outlier cluster and the non to-be-outlier cluster corresponding to each piece of sample data;

determining whether a minimum inter-cluster similarity among multiple inter-cluster similarities respectively corresponding to all pieces of sample data in the clustered cluster is less than a third threshold; and taking a to-be-outlier cluster and a non to-be-outlier cluster corresponding to the minimum inter-cluster similarity as two new clustered clusters respectively, in response to the minimum inter-cluster similarity being less than the third threshold.

6. The method according to claim 1, wherein the clustering and merging the N initialization clustered clusters comprises:

taking the N initialization clustered clusters as multiple to-be-clustered clusters;

acquiring inter-cluster similarities between each to-be-clustered cluster and other to-be-clustered clusters;

determining whether a maximum inter-cluster similarity among all inter-cluster similarities corresponding to the multiple to-be-clustered clusters is greater than a fourth threshold;

merging two to-be-clustered clusters corresponding to the maximum inter-cluster similarity to obtain a new to-be-clustered cluster, in response to the maximum inter-cluster similarity being greater than the fourth threshold; and continuing clustering and merging multiple new to-be-clustered clusters constituted by the new to-be-clustered cluster and other to-be-clustered clusters that are not merged this time until no to-be-clustered cluster can be merged.

7. The method according to claim 1, wherein and the inter-sample similarity between two images comprises a cosine distance between two feature vectors respectively corresponding to the two images.

8. An apparatus for image clustering, comprising:
a processor; and
a memory for storing instructions executable by the processor;
wherein the processor is configured to:
acquire an inter-sample similarity between every two pieces of sample data in M pieces of sample data, where M is a positive integer and the M pieces of sample data are M images;

merge the M pieces of sample data into N initialization clustered clusters according to the acquired inter-sample similarity, where N is a positive integer smaller than M and each of the N initialization clustered clusters comprises at least one piece of sample data; and cluster and merging the N initialization clustered clusters to obtain multiple clustered clusters corresponding to the M pieces of sample data;

wherein in acquiring an inter-sample similarity between every two pieces of sample data in the M pieces of sample data, the processor is further configured to:

for each of the M images, perform feature extraction to obtain a feature vector of the image; and determine an inter-sample similarity between every two of the M images based on feature vectors of the two images; and wherein in merging the M pieces of sample data into N initialization clustered clusters according to the acquired inter-sample similarity, the processor is further configured to:

merge, for any two pieces of sample data in the M pieces of sample data, the two pieces of sample data into a suspected initialization clustered cluster when the inter-sample similarity of the two pieces of sample data is greater than a first threshold, so as to obtain multiple suspected initialization clustered clusters; and merge, for the obtained multiple suspected initialization clustered clusters, at least two of the suspected initialization clustered clusters, both comprising a same subset having a number of pieces of sample data, which is greater than or equal to a second threshold, into an initialization clustered cluster.

9. The apparatus according to either claim 8, wherein the processor is further configured to:

take, for the obtained multiple suspected initialization clustered clusters, each of suspected initialization clustered cluster that cannot be merged with one another as a respective initialization clustered cluster.

10. The apparatus according to claim 8, wherein the second threshold is determined according to a linear function of a number of pieces of sample data comprised in one or more of the at least two suspected initialization clustered clusters.

11. The apparatus according to claim 8, the processor is further configured to:
perform outlier separation on at least one of the multiple clustered clusters, and take all clustered clusters obtained by the outlier separation as multiple clustered clusters corresponding to the M pieces of sample data.

12. The apparatus according to claim 11, wherein the processor is configured to perform outlier separation on one of the clustered clusters;
the processor is configured to:
obtain, for any clustered cluster, a to-be-outlier cluster and a non to-be-outlier cluster corresponding to each piece of sample data in the clustered cluster, wherein the to-be-outlier cluster corresponding to each piece of sample data comprises the piece of sample data, and the non to-be-outlier cluster comprises other pieces of sample data in the clustered cluster than the piece of sample data;
acquire an inter-cluster similarity between the to-be-outlier cluster and the non to-be-outlier cluster corresponding to each piece of sample data;
determine whether a minimum inter-cluster similarity among multiple inter-cluster similarities respectively corresponding to all pieces of sample data in the clustered cluster is less than a third threshold; and
take a to-be-outlier cluster and a non to-be-outlier cluster corresponding to the minimum inter-cluster similarity as two new clustered clusters respectively, in response to the minimum inter-cluster similarity being less than the third threshold.

13. The apparatus according to claim 8, wherein the processor is configured to:
take the N initialization clustered clusters as multiple to-be-clustered clusters;
acquire inter-cluster similarities between each to-be-clustered cluster and other to-be-clustered clusters;
determine whether a maximum inter-cluster similarity among all inter-cluster similarities corresponding to the multiple to-be-clustered clusters is greater than a fourth threshold; and
merge two to-be-clustered clusters corresponding to the maximum inter-cluster similarity to obtain a new to-be-clustered cluster in response to the maximum inter-cluster similarity being greater than the fourth threshold, and triggering to continue clustering and merging multiple new to-be-clustered clusters constituted by the new to-be-clustered cluster and other to-be-clustered clusters that are not merged this time until no to-be-clustered cluster can be merged.

14. The apparatus according to claim 8, wherein the inter-sample similarity between two images comprises a cosine distance between two feature vectors respectively corresponding to the two images.

15. An electronic device, comprising: a housing, a processor, a memory, a circuit board, and a power supply circuit, wherein the circuit board is provided inside a space enclosed by the housing, and the processor and the memory are disposed on the circuit board; the power supply circuit is configured to supply power to various circuits or devices of a terminal; the memory is configured to store executable program codes; the processor is configured to read the executable program codes stored in the memory to run programs corresponding to the executable program codes so as to execute operations corresponding to the clustering method of claim 1.

16. A non-transitory computer-readable medium having stored therein instructions that, when executed by a processor, causes to perform the method comprising
acquiring an inter-sample similarity between every two pieces of sample data in M pieces of sample data, where M is a positive integer and the M pieces of sample data are M images;
merging the M pieces of sample data into N initialization clustered clusters according to the acquired inter-sample similarity, where N is a positive integer smaller than M and each of the N initialization clustered clusters comprises at least one piece of sample data; and
clustering and merging the N initialization clustered clusters to obtain multiple clustered clusters corresponding to the M pieces of sample data;
wherein the acquiring an inter-sample similarity between every two pieces of sample data in the M pieces of sample data comprises:
for each of the M images, performing feature extraction to obtain a feature vector of the image; and
determining an inter-sample similarity between every two of the M images based on feature vectors of the two images; and
wherein the merging the M pieces of sample data into N initialization clustered clusters according to the acquired inter-sample similarity comprises:
for any two pieces of sample data in the M pieces of sample data, merging the two pieces of sample data into a suspected initialization clustered cluster when the inter-sample similarity of the two pieces of sample data is greater than a first threshold, so as to obtain multiple suspected initialization clustered clusters; and
for the obtained multiple suspected initialization clustered clusters, merging at least two of the suspected initialization clustered clusters, both comprising a same subset having a number of pieces of sample data, which is greater than or equal to a second threshold, into an initialization clustered cluster.

\* \* \* \* \*